United States Patent
Abedini et al.

(10) Patent No.: US 11,595,922 B2
(45) Date of Patent: *Feb. 28, 2023

(54) RADIO SYNCHRONIZATION CONFIGURATION IN DIFFERENT OPERATION MODES

(71) Applicant: QUALCOMM Incorporated, San Diego, CA (US)

(72) Inventors: Navid Abedini, Basking Ridge, NJ (US); Hung Dinh Ly, San Diego, CA (US); Tao Luo, San Diego, CA (US); Muhammad Nazmul Islam, Littleton, MA (US); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/337,141

(22) Filed: Jun. 2, 2021

(65) Prior Publication Data

US 2021/0289458 A1    Sep. 16, 2021

Related U.S. Application Data

(63) Continuation of application No. 15/926,684, filed on Mar. 20, 2018, now Pat. No. 11,071,073.

(Continued)

(51) Int. Cl.
*H04W 56/00* (2009.01)
*H04W 76/28* (2018.01)
*H04W 84/04* (2009.01)

(52) U.S. Cl.
CPC ..... *H04W 56/001* (2013.01); *H04W 56/0015* (2013.01); *H04W 76/28* (2018.02); *H04W 84/042* (2013.01)

(58) Field of Classification Search
CPC ............................ H04W 56/00; H04W 56/001
See application file for complete search history.

(56) References Cited

U.S. PATENT DOCUMENTS 8,279,794 B2    10/2012    Krishnaswamy
8,699,361 B2    4/2014    Jim et al.
(Continued)

FOREIGN PATENT DOCUMENTS

WO    2010036276 A2    4/2010
WO    2010039875         4/2010
(Continued)

OTHER PUBLICATIONS

Taiwan Search Report—TW107109637—TIPO—dated Jun. 16, 2021.
(Continued)

*Primary Examiner* — Sulaiman Nooristany
(74) *Attorney, Agent, or Firm* — Patterson + Sheridan, L.L.P.

(57) ABSTRACT

Certain aspects of the present disclosure relate to methods and apparatus synchronization configuration in different operation modes using communications systems operating according to new radio (NR) technologies. For example, a method for wireless communications by a base station (BS) may include determining an operation mode of the BS, determining a transmission configuration of at least one of a one or more synchronization channels or a one or more synchronization signals based on the operation mode, and transmitting the one or more synchronization channels or the one or more synchronization signals based on the determined transmission configuration.

28 Claims, 11 Drawing Sheets

Related U.S. Application Data

(60) Provisional application No. 62/569,120, filed on Oct. 6, 2017, provisional application No. 62/489,017, filed on Apr. 24, 2017, provisional application No. 62/485,512, filed on Apr. 14, 2017.

(56) References Cited

U.S. PATENT DOCUMENTS

| | | | |
|---|---|---|---|
| 9,591,644 | B2 | 3/2017 | Chen et al. |
| 9,735,942 | B2 | 8/2017 | Xu et al. |
| 2016/0095074 | A1* | 3/2016 | Park .................. H04W 72/10 370/350 |
| 2017/0048775 | A1* | 2/2017 | Kim .................. H04W 16/28 |
| 2017/0094621 | A1 | 3/2017 | Xu et al. |
| 2017/0265156 | A1* | 9/2017 | Xue .................. H04W 4/70 |
| 2017/0339641 | A1* | 11/2017 | Nigam ............. H04W 52/0216 |
| 2018/0302867 | A1 | 10/2018 | Abedini et al. |
| 2019/0053061 | A1* | 2/2019 | Sui .................. H04W 72/0446 |
| 2019/0268867 | A1 | 8/2019 | Luo et al. |

FOREIGN PATENT DOCUMENTS

| | | |
|---|---|---|
| WO | 2011100504 A1 | 8/2011 |
| WO | 2014165838 A2 | 10/2014 |
| WO | 2015023910 A2 | 2/2015 |
| WO | 2017014600 A1 | 1/2017 |

OTHER PUBLICATIONS

Huawei., et al., "Considerations on Cell Identification for NR", 3GPP Draft; R4-1703611, 3rd Generation Partnership Project (3GPP), Mobile Competence Centre; 650, Route Des Lucioles; F-06921 Sophia-Antipolis Cedex; France vol. RAN WG4, No. Spokane, USA; Apr. 3, 2017-Apr. 7, 2017, Apr. 3, 2017 (Apr. 3, 2017), XP051246773, 3 pages, Retrieved from the Internet: URL: http://www.3gpp.org/ftp/Meetings_3GPP_SYNC/RAN4/Docs/ [retrieved on Apr. 3, 2017].

Intel Corporation., "Synchronization Signal Periodicity," 3GPP Draft; R1-1704710, Intel SS Periodicity, 3rd Generation Partnership Project (3GPP), Mobile Competence Centre; 650, Route Des Lucioles; F-06921, Sophia-Antipolis Cedex; France, vol. RAN WG1, Spokane, WA, USA.; Apr. 3, 2017-Apr. 7, 2017, Apr. 2, 2017 (Apr. 2, 2017), XP051242849, 4 pages, Retrieved from the Internet: URL: http://www.3gpp.org/ftp/Meetings_3GPP_SYNC/RAN1/Docs/ [retrieved on Apr. 2, 2017].

International Search Report and Written Opinion—PCT/US2018/023468—ISA/EPO—dated Jun. 13, 2018.

Motorola Mobility., et al., "Discussion on SS Block Transmission", 3GPP Draft; R1-1705549, NR SS Block Transmission, 3rd Generation Partnership Project (3GPP), Mobile Competence Centre, 650, Route Des Lucioles, F-06921, Sophia-Antipolis Cedex, France, vol. RAN WG1, Spokane, USA; Apr. 3, 2017-Apr. 7, 2017, Apr. 2, 2017 (Apr. 2, 2017), XP051243677, 4 pages, Retrieved from the Internet: URL: http://www.3gpp.org/ftp/Meetings_3GPP_SYNC/RAN1/Docs/[retrieved on Apr. 2, 2017].

Nokia, et al., "SS Block Composition, SS Burst Set Composition and SS Time Index Indication," 3GPP TSG-RAN WG1 Meeting #88bis, R1-1705837, Spokane, WA, USA, Apr. 3-7, 2017, 13 pages.

Taiwan Search Report—TW111107901—TIPO—dated Dec. 9, 2022.

* cited by examiner

RADIO SYNCHRONIZATION CONFIGURATION IN DIFFERENT OPERATION MODES

CLAIM OF PRIORITY UNDER 35 U.S.C. § 119

The present Applications is a continuation of U.S. patent application Ser. No. 15/926,684, filed Mar. 20, 2018, which claims benefit of U.S. Provisional Patent Application No. 62/569,120, filed Oct. 6, 2017, U.S. Provisional Patent Application No. 62/489,017, filed Apr. 24, 2017, and U.S. Provisional Patent Application No. 62/485,512, filed Apr. 14, 2017 assigned to the assignee hereof and hereby expressly incorporated by reference herein.

BACKGROUND

Field of the Disclosure

The present disclosure relates generally to communication systems, and more particularly, to methods and apparatus for synchronization configuration in different operation modes using communications systems operating according to new radio (NR) technologies.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station (BS). The method generally includes determining an operation mode of the BS, determining a transmission configuration of at least one of a one or more synchronization channels or a one or more synchronization signals based on the operation mode, and transmitting the one or more synchronization channels or the one or more synchronization signals based on the determined transmission configuration.

Certain aspects provide a method for wireless communication by a user equipment (UE). The method generally includes determining a transmission configuration, used by a base station (BS), to transmit at least one of a one or more synchronization channels or a one or more synchronization signals based on an operation mode, and configuring the UE to communicate based on the transmission configuration.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
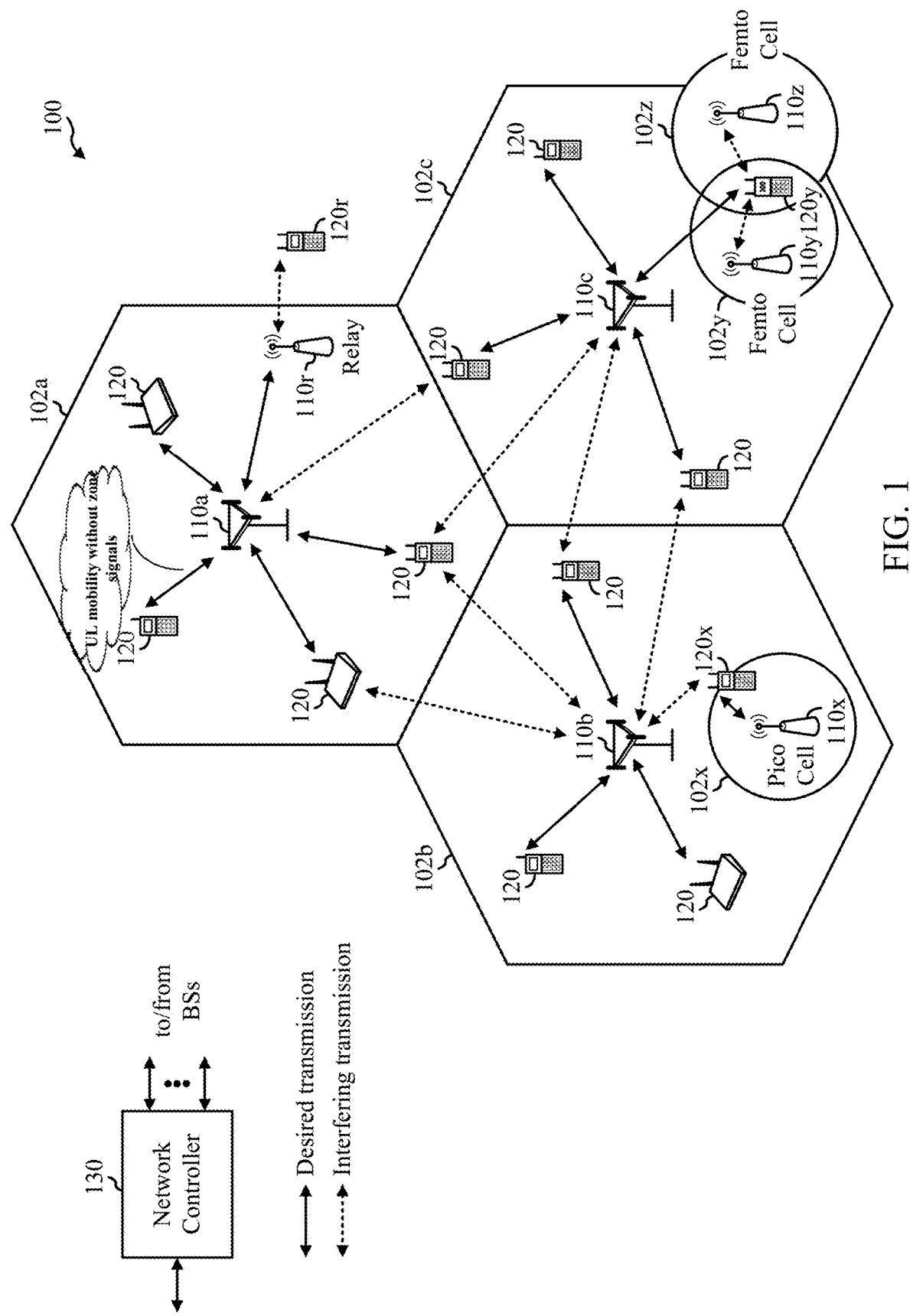
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes with a length of 10 ms. Consequently, each subframe may have a length of 1 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
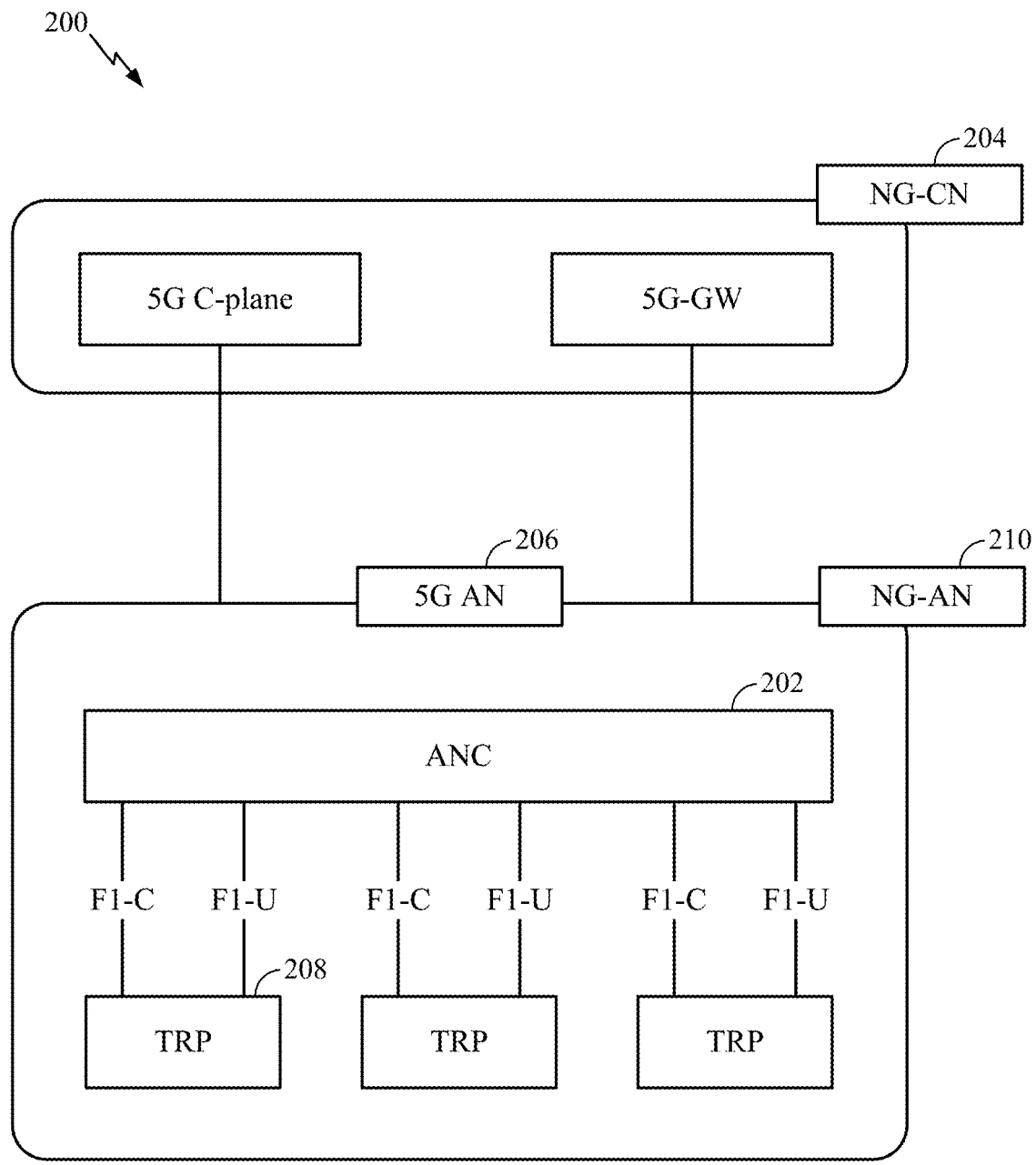
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
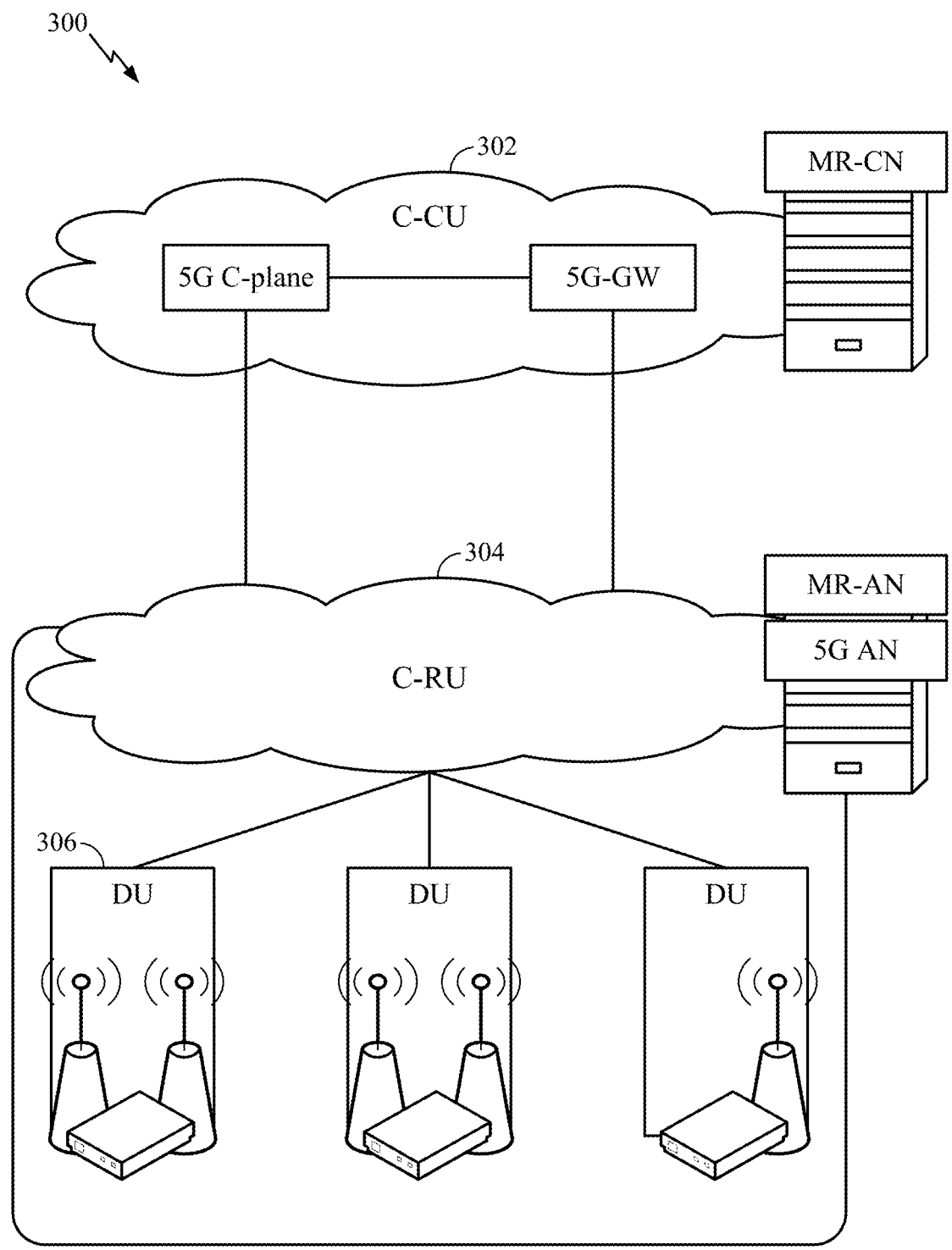
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
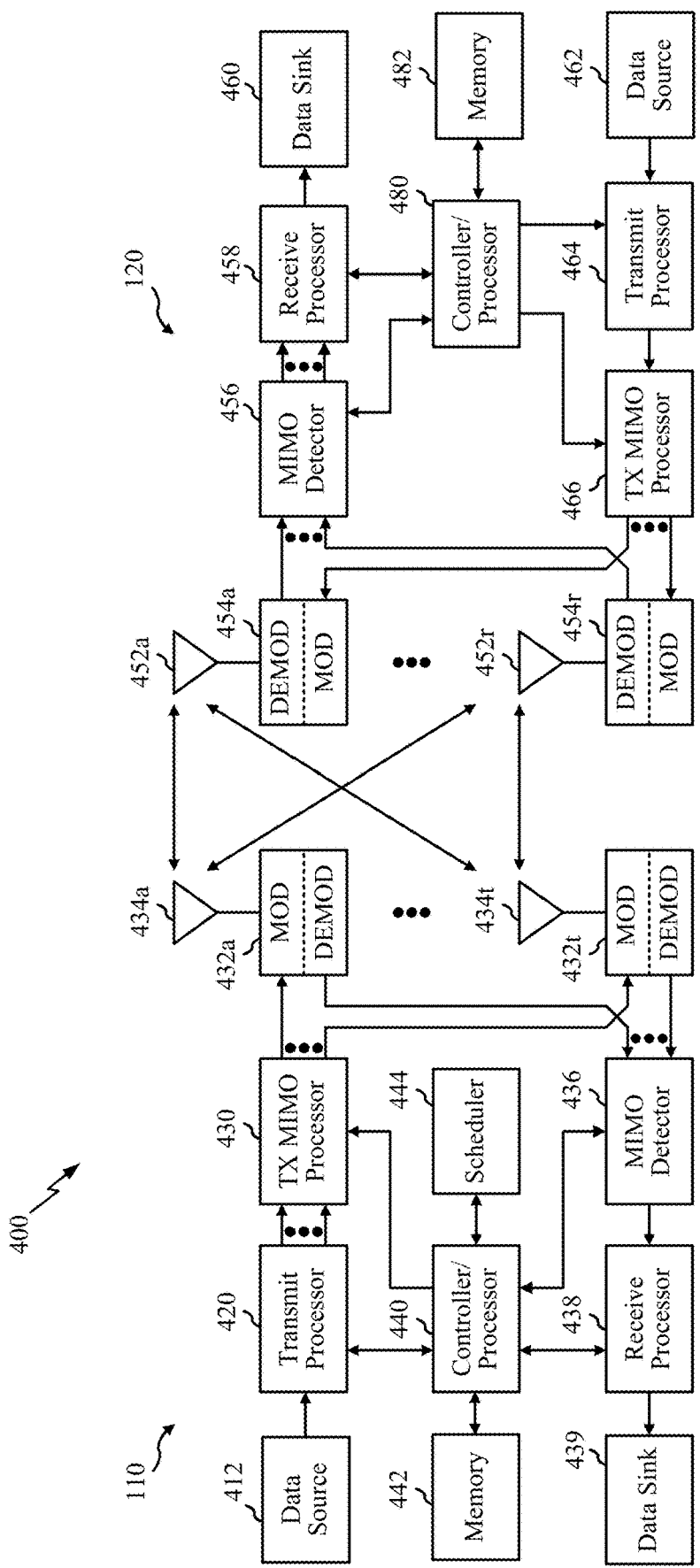
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 13.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
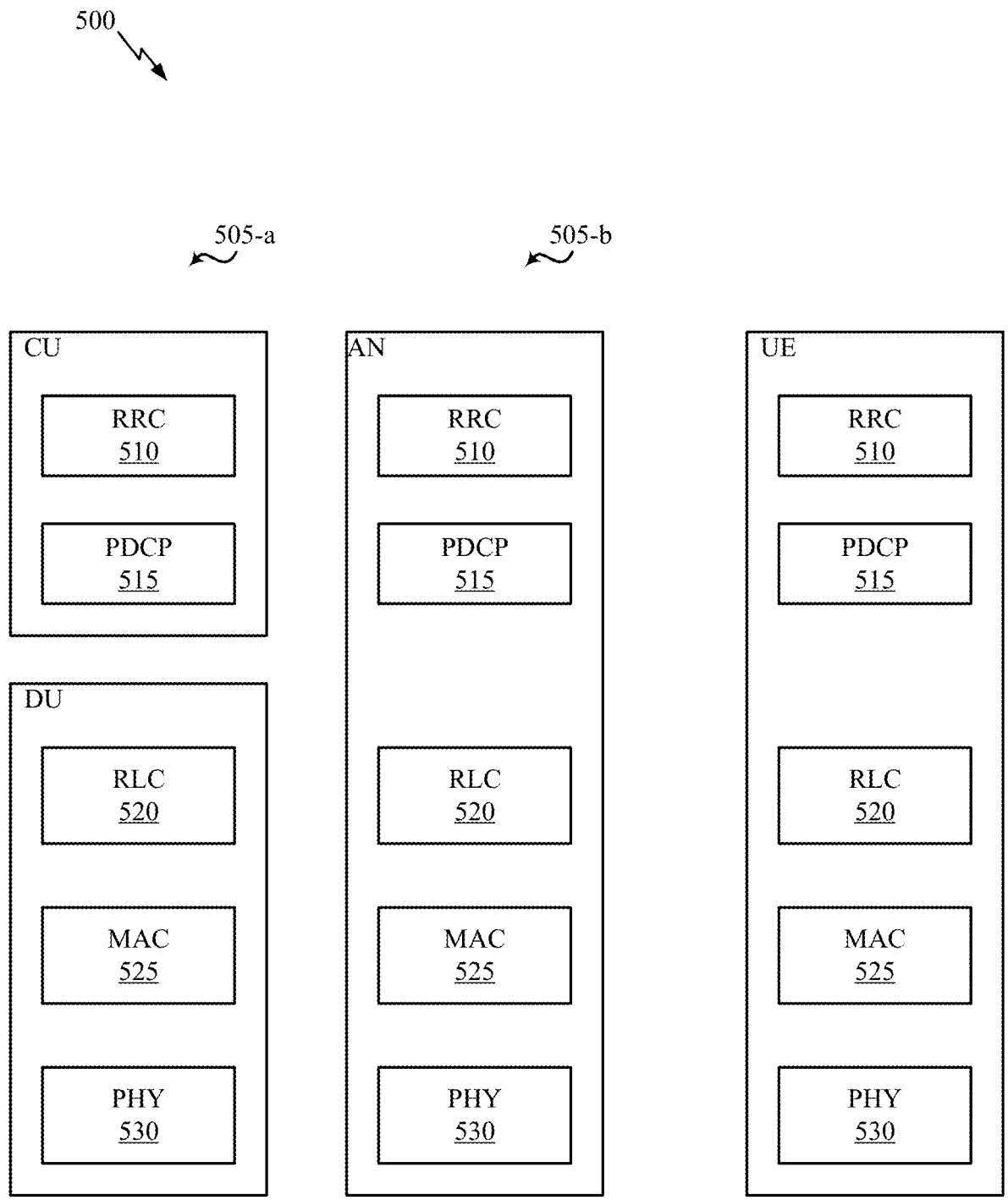
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
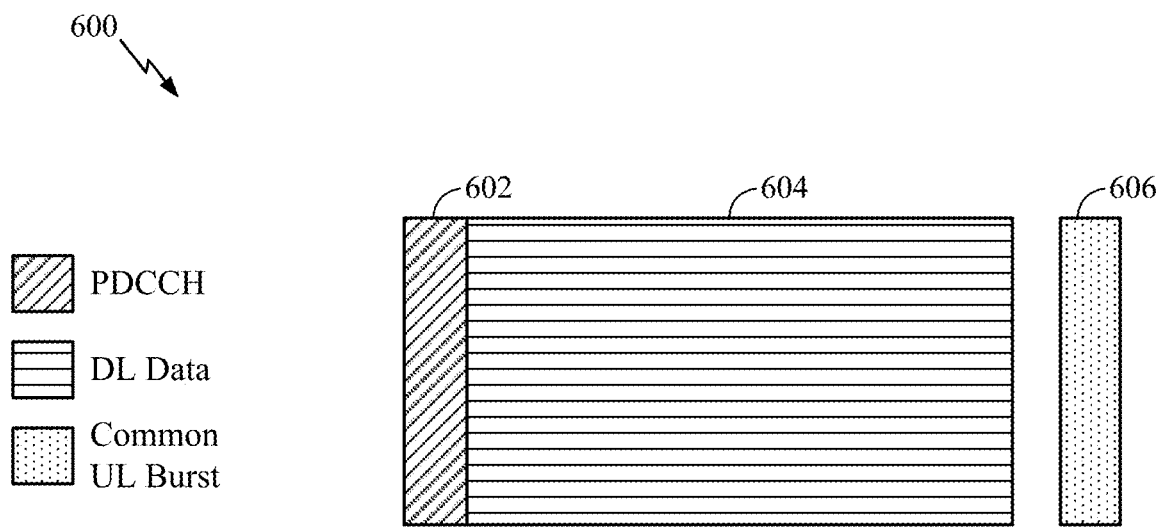
FIG. 6 illustrates an example of a DL-centric subframe, in accordance with certain aspects of the present disclosure.

FIG. 6 is a diagram 600 showing an example of a DL-centric subframe. A subframe may comprise a number of slots, for example, one or more DL slots and/or UL slots. A DL-centric subframe may comprise more DL slots than UL slots. The DL-centric subframe, as shown in FIG. 6, may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
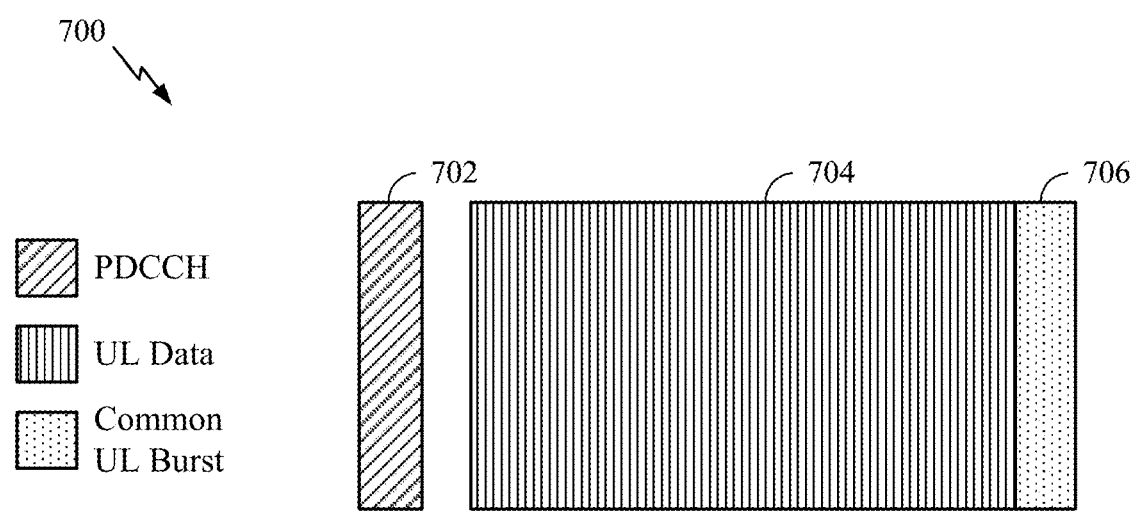
FIG. 7 illustrates an example of an UL-centric subframe, in accordance with certain aspects of the present disclosure.

FIG. 7 is a diagram 700 showing an example of an UL-centric subframe. As noted above, a subframe may comprise a number of slots including one or more DL slots and/or UL slots. A UL-centric subframe may comprise more UL slots than DL slots. The UL-centric subframe, a shown in FIG. 7, may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Data Transmission in Synchronization Slots

Under 3GPP's 5G wireless communication standards, a structure has been defined for NR synchronization (synch) signals (NR-SS), also referred to as NR synchronization channels. Under 5G, a set of consecutive OFDM symbols carrying different types of synch signals (e.g., primary synchronization signal (PSS), secondary synchronization signal (SSS), time synchronization signal (TSS), PBCH) forms an SS block. In some cases, a set of one or more SS blocks may form an SS burst. In addition, different SS blocks may be transmitted on different beams to achieve beam-sweeping for synch signals, which may be used by a UE to quickly identify and acquire a cell. Further, one or more of the channels in an SS block may be used for measurements. Such measurements may be used for various purposes such as radio link management (RLM), beam management, etc. For example, a UE may measure the cell quality and report the quality back in the form of a measurement report, which may be used by the base station for beam management and other purposes.

Figure 8:
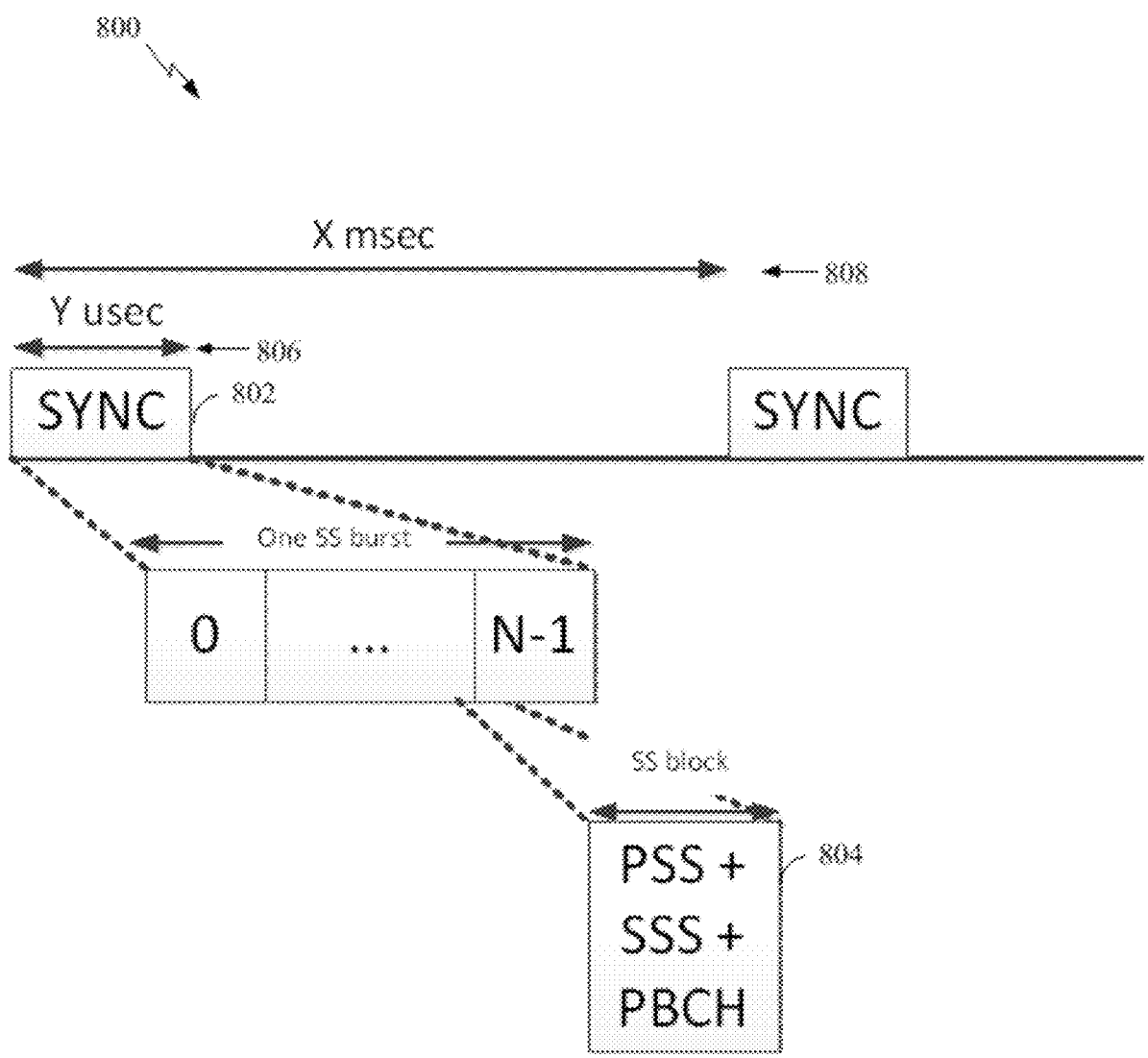
FIG. 8 illustrates example operations for a base station transmitting FDM data within synchronization signal (SS) bursts, in accordance with certain aspects of the present disclosure.

FIG. 8 illustrates an example transmission timeline 800 of synchronization signals for a new radio telecommunications system. A BS, such as BS 110 shown in FIG. 1, may transmit an SS burst 802 during a period 806 of Y pec, in accordance with certain aspects of the present disclosure. Operations 800 begin, at 802, by transmitting a synchronization signal (SS) burst. The SS burst may include N SS blocks 804 with indices of zero to N−1, and the BS may transmit different SS blocks of the burst using different transmit beams (e.g., for beam-sweeping). Each SS block may include, for example, a primary synchronization signal (PSS), a secondary synchronization signal (SSS), and one or more physical broadcast channels (PBCHs), also referred to as synchronization channels. The BS may transmit SS bursts on a periodic basis, with a period 808 of X msec.

Figure 9:
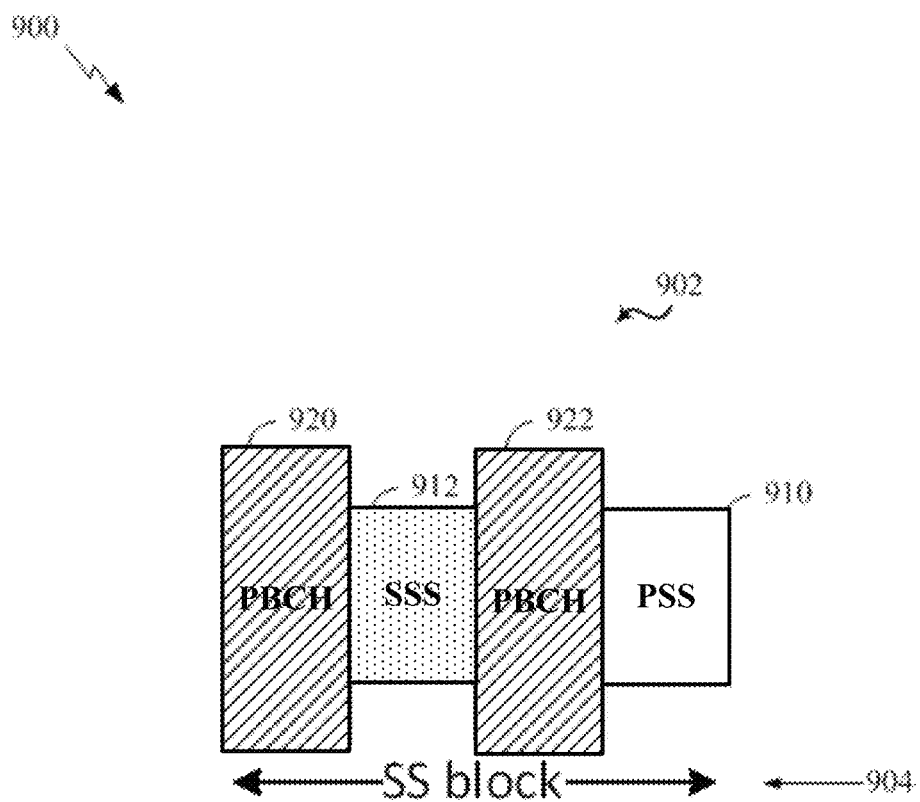
FIG. 9 illustrates example operations for a user equipment (UE) receiving the SS bursts of FIG. 8, in accordance with certain aspects of the present disclosure.

FIG. 9 illustrates an example resource mapping 900 for an exemplary SS block 902. The exemplary SS block may be transmitted by a BS, such as BS 110 in FIG. 1, over a period 904 (e.g., Y pec, as shown in FIG. 8). The exemplary SS block includes a PSS 910, an SSS 912, and two PBCHs 920 and 922, although the disclosure is not so limited, and an SS block may include more or fewer synchronization signals and synchronization channels. As illustrated, a transmission bandwidth (B1) of the PBCHs may be different from a transmission bandwidth (B2) of the synchronization signals. For example, the transmission bandwidth of the PBCHs may be 288 tones, while the transmission bandwidth of the PSS and SSS may be 127 tones.

Example of New Radio Synchronization Configuration in Different Operation Modes

In accordance with one or more aspects of embodiments described herein, methods and apparatus for synchronization configuration in different operation modes using communications systems operating according to new radio (NR) technologies are provided.

Although NR defines a common design for synchronization signals (PSS/SSS) and synchronization channel (PBCH) for all operation modes, different values of synchronization periodicity (SS burst set periodicity) are proposed for different modes. Further, there are a variety of different synchronization modes such as an initial acquisition in standalone mode, an initial acquisition in non-standalone mode, and synchronization in an idle mode or a connected mode. An example of a periodicity value for an initial acquisition in standalone mode may be 20 msec. According to other examples, for either an idle mode, a connected mode, and/or a non-standalone initial acquisition mode a variety of different time values may be used such as, for example, 5 msec, 10 msec, 20 msec, 40 msec, 80 msec, or 160 msec. Therefore, in general the transmission (Tx) configuration of synchronization in different modes may be different.

Thus, in accordance with one or more cases, a Tx configuration of one or more of the synchronization reference signals and synchronization channels (for example, a physical broadcast channel (PBCH)) may be determined based on an operation mode. According to one or more cases, the Tx configuration may refer to many different features such as a resource configuration, a sweeping pattern, and/or a signal design. Further, in accordance with one or more aspects, idle/connected synchronization transmissions may occur on a set of time-frequency resources different from those used for initial acquisition synchronization transmission. According to one or more cases, the Tx configuration may be signaled to the UE thru the use of different means.

Figure 10:
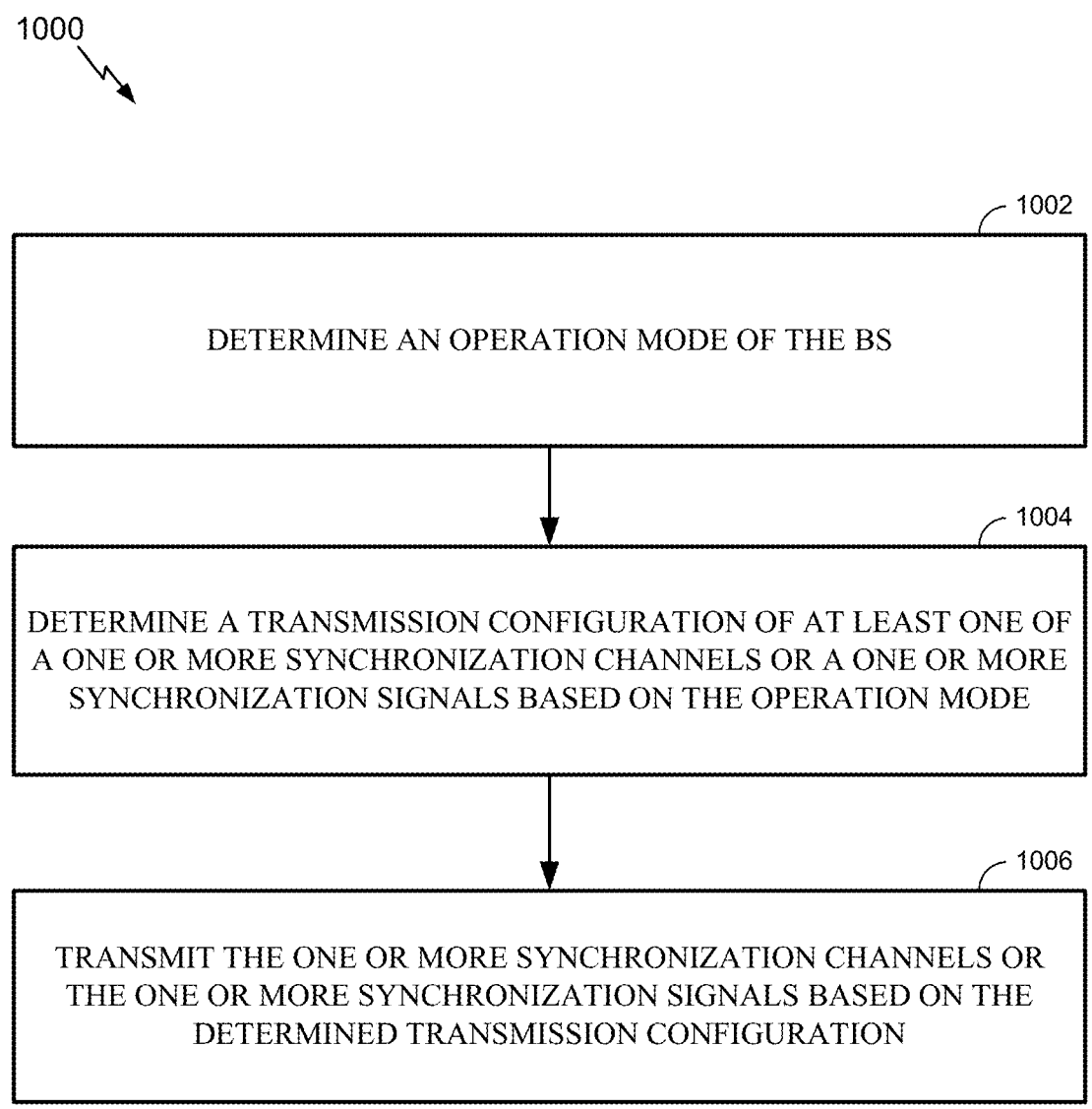
FIG. 10 illustrates example operations for wireless communications by a base station (BS), in accordance with aspects of the present disclosure.

FIG. 10 illustrates operations 1000 for wireless communications by a base station (BS), in accordance with aspects of the present disclosure. Specifically, operations 1000 begin, at block 1002, with determining an operation mode of the BS. The operations 1000 further include, at block 1004, determining a transmission configuration of at least one of a one or more synchronization channels or a one or more synchronization signals based on the operation mode. Additionally, operations 1000 include, at block 1006, transmitting the one or more synchronization channels or the one or more synchronization signals based on the determined transmission configuration. In some cases, operations 100 may further include signaling the transmission configuration to a user equipment (UE) through one or more of a master information block (MIB), a system information block (SIB), and a radio resource control (RRC) signaling According to one or more cases, determining the operation mode may be based on one or more of an indication received from an upper layer signaling; an indication received from the network; a preconfigured schedule; an indication received from one or more other BSs; an indication received from one or more UEs; and a measurement of the one or more signals received from one or more UEs.

In accordance with one or more aspects, the one or more synchronization channels may include one or more physical broadcast channels (PBCH). The one or more synchronization signals may include at least one of a primary synchronization signal (PSS), a secondary synchronization signal (SSS), a third synchronization signal (TSS) carrying SS-block timing index information, a demodulation reference signal (DMRS) for physical broadcast channel (PBCH), or a beam reference signal. The operation mode may include providing synchronization for at least one of an initial acquisition in standalone mode, an initial acquisition in non-standalone mode, one or more UEs in an idle mode, or one or more UEs in a connected mode.

Further, the transmission configuration may include configuration of one or more of: at least one of a time resource or a frequency resource used for the transmission of the one or more synchronization channels or the one or more synchronization signals; at least one of a digital precoding or an analog precoding used for transmitting at least one of the one or more synchronization channels or the one or more synchronization signals from one or more antenna ports; a number of antenna ports used for transmission of at least one of the one or more synchronization channels or the one or more synchronization signals; a composition of at least one of a synchronization signal (SS) block, an SS burst, or an SS burst set; a beam sweeping pattern; or a waveform design of the one or more synchronization signals. The waveform design may include at least one of a TSS or a DMRS for at least one of a PBCH or a beam reference.

In some cases, the operation mode may be signaled to a user equipment (UE) through the one or more synchronization channels or the one or more synchronization signals. Additional operations may be included such as signaling, within a broadcast channel (BCH) transmission time interval (TTI), a location of a synchronization signal (SS) block consisting of at least one of the one or more synchronization channels or the one or more synchronization signals to the UE. Further, the signaling may be provided through the one or more synchronization channels or the one or more synchronization signals.

In one or more cases, transmitting the one or more synchronization channels or the one or more synchronization signals based on the determined transmission configuration may include transmitting the one or more synchronization channels or the one or more synchronization signals on a first set of time-frequency resources when transmitting in at least one of an initial acquisition in standalone mode or an initial acquisition in non-standalone mode. Additionally, transmitting the one or more synchronization channels or the one or more synchronization signals on a second set of time-frequency resources different from the first set of time-frequency resources when transmitting in at least one of an idle mode or connected mode may be included. According to one or more cases, the first set of time-frequency resources may include a different frequency band for transmission than the second set of time-frequency resources. In another example, the first set of time-frequency resources may include a synchronization raster. In one or more cases, the first set of time-frequency resources may include the same frequency band as the second set of time-frequency resources. In accordance with some cases, the first set of time-frequency resources may include different time locations as compared to the second set of time-frequency resources.

In accordance with one or more cases, transmitting the one or more synchronization channels or the one or more synchronization signals based on the determined transmission configuration may include transmitting, to a select group of UEs in a discontinuous reception (DRX) operation mode, the one or more synchronization channels or the one or more synchronization signals on a set of DRX time-frequency resources. The DRX time-frequency resources may include one or more of a non-raster location and time domain resources different from initial acquisition time domain resources. Further, the one or more synchronization channels or the one or more synchronization signals may be transmitted before a DRX ON cycle to the select group of UEs.

Figure 11:
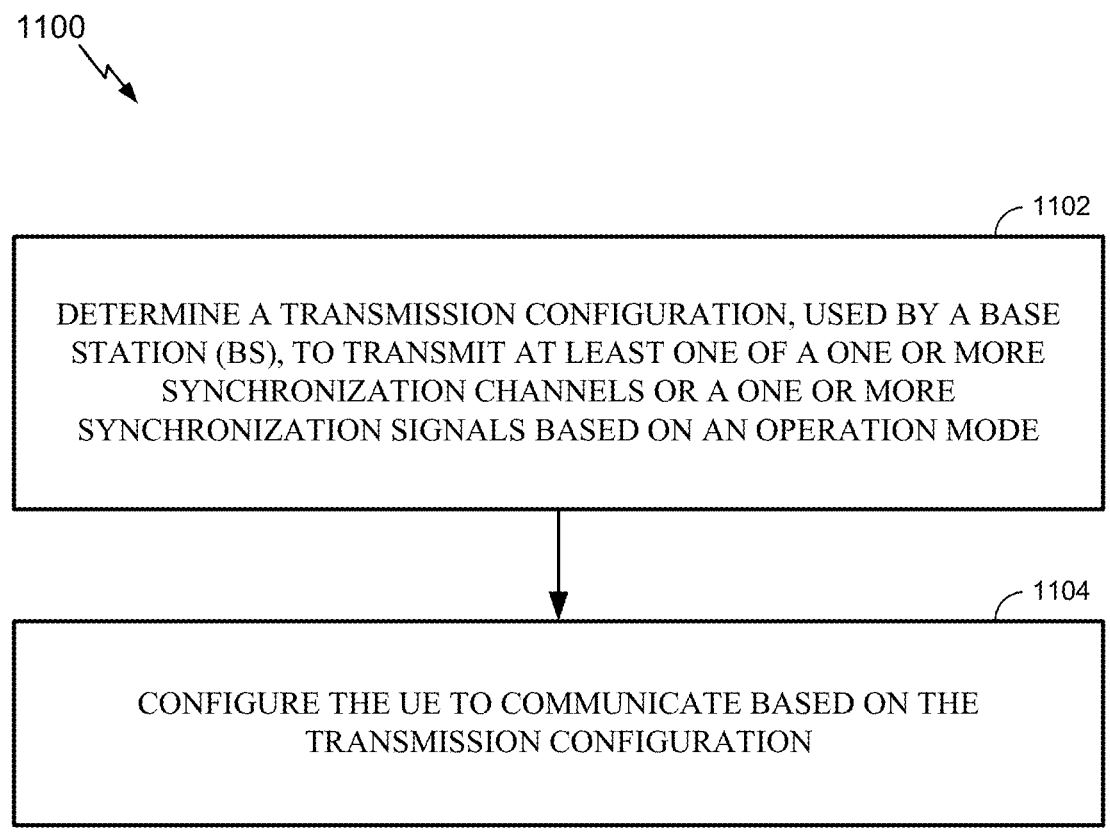
FIG. 11 illustrates example operations for wireless communications by a user equipment (UE), in accordance with aspects of the present disclosure.

FIG. 11 illustrates example operations for wireless communications by a user equipment (UE), in accordance with aspects of the present disclosure. Specifically, operations 1100 begin, at block 1102, with determining a transmission configuration, used by a base station (BS), to transmit at least one of a one or more synchronization channels or a one or more synchronization signals based on an operation mode. The operations 1100 may further include, at block 1004, configuring the UE to communicate based on the transmission configuration.

According to some cases, additional operations may be included such as receiving an indication of the operation mode of the BS through the one or more synchronization channels or the one or more synchronization signals. Further, configuring the UE to communicate may be further based on the determined operation mode of the BS. According to one or more cases, the operation mode of the BS may include providing synchronization for at least one of an initial acquisition in standalone mode, an initial acquisition in non-standalone mode, one or more UEs in an idle mode, or one or more UEs in a connected mode.

Further, another operation that may be included is receiving an indication of a location of a synchronization signal (SS) block consisting of at least one of the one or more synchronization channels or the one or more synchronization signals, within a broadcast channel (BCH) transmission time interval (TTI). The indication may be provided through the one or more synchronization channels or the one or more synchronization signals. The operations may further include determining the operation mode of the BS based, at least in part, on the location of the SS block, and configuring the UE to communicate based further on the determined operation mode of the BS. The operation mode of the BS may include providing synchronization for at least one of an initial acquisition in standalone mode, an initial acquisition in non-standalone mode, one or more UEs in an idle mode, or one or more UEs in a connected mode.

Additional features and details for one or more embodiments may be described as follows. According to one or more cases, transmission configuration of a synchronization reference signals and/or synchronization channel (PBCH) may be determined based on an operation mode. The synchronization reference signals may be a PSS, a SSS, a TSS (carrying SS block timing index info), and/or a DMRS for PBCH or a beam reference signal. The operation mode may refer to one or more of an initial acquisition (in standalone or non-standalone) mode, an idle mode, or a connected mode.

The Tx configuration may include or reference any one or combination of different features. Some of these features may include: time and/or frequency resources used for the transmission of the synchronization reference signals (and channel); digital and/or analog precoding for beam-forming used for the transmission from each antenna port; a number of antenna ports used for the transmission of the synchronization reference signals and/or synchronization channel; and a composition of SS block, SS burst, and/or SS burst set. Another feature that may be included in the Tx configuration includes a beam sweeping pattern. The beam sweeping pattern may include how frequently an SS is transmitted towards different directions. Further, the Tx configuration for include a waveform design of the reference signals. For example, Tx configuration may include a TSS and/or DMRS for PBCH and/or beam reference.

According to one or more cases, one example may include an idle/connected synchronization transmission which may occur on a set of time-frequency resources different from those used for initial acquisition synchronization transmission In accordance with one or more cases, an idle/connected synchronization transmission may be provided on a different frequency band from an initial acquisition synchronization transmission which may be transmitted using another frequency band. Particularly, in accordance with one or more cases, a specific application may include a scenario where an initial acquisition synchronization may be transmitted on a synchronization raster in the frequency domain. In contrast, the idle/connected mode synchronization may or may not be transmitted on a synchronization raster.

In accordance with one or more cases, transmissions may also be provided during a discontinuous reception (DRX) operation mode. in some cases, synchronization transmission may occur in a non-raster location, in the frequency domain (FD) while, in the time domain (TD), some resources may be used that are not necessarily aligned with TD resources of the initial acquisition synchronization. Synchronization may be transmitted right before a DRX ON cycle for a group of UEs. In this example, such synchronization may be used as a warm-up signal in this case, similar to a CSI-RS. Further, the Tx configuration may include transmission periodicity of SS blocks and possibly a reduced set of SS blocks compared to the initial acquisition.

The Tx configuration for synchronization may be signaled to a UE thru one or any combination of an MIB, SIB, or RRC signaling, any one or more of which may be preconfigured in accordance with one or more cases. In some cases, the Tx configuration for synchronization in idle/connected mode or non-standalone mode may be signaled to a UE thru one or any combination of a MIB, SIB, or RRC signaling over LTE, in the case of LTE+NR dual connectivity being provided. According to another example, the MIB, SIB, RRC signaling may be provided over a first NR system, in a case where the first NR system and a second NR system are together providing dual connectivity. The first and second NR systems may operate at different carrier frequencies. For example, the first NR system may operate at a sub-6 GHz and the second NR system may operate on mmWave.

Figure 12:
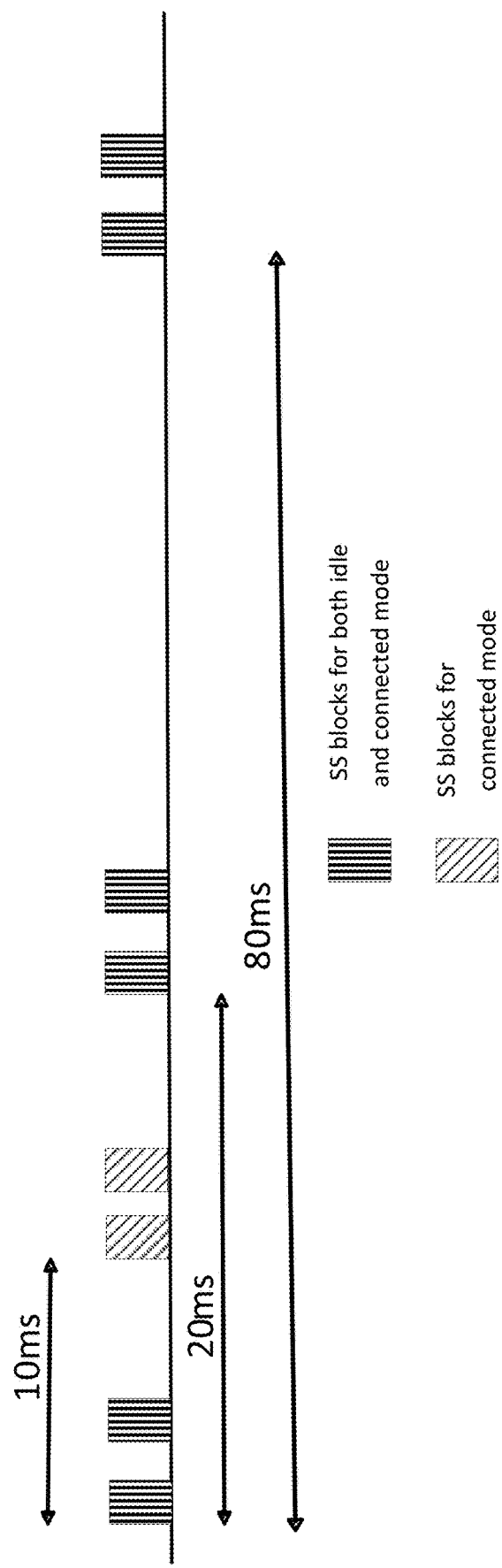
FIG. 12 illustrates an example of synchronization transmissions, in accordance with aspects of the present disclosure.

FIG. 12 illustrates an example of synchronization transmissions, in accordance with aspects of the present disclosure. As shown, SS blocks for both ideal and connected mode are transmitted in pairs at an initial time, at 20 msec, and at 80 msec as shown. Additionally, SS blocks for connected mode are transmitted as a pair starting at 10 msec. after the initial time. Accordingly, as shown the transmission of both sets of blocks do no overlap in time showing different time resource usage. Further, one or more of the SS block transmissions may also be transmitted using a different frequency from that used for one or more of the other SS block transmissions.

In accordance with one or more cases, an idle/connected synchronization transmission may occur on a set of time-frequency resources different from those used for initial acquisition sync transmission. In some cases, SS blocks may convey whether one or more of the SS blocks are intended for idle/connected SYNC. According to another example, SS blocks may convey the exact location of SS block inside the BCH transmission time interval (TTI); instead of just mentioning the SS block index in the SS burst set or the SS burst set index inside the BCH TTI. In accordance with one or more cases, one or more combinations of PSS, SSS, TSS, and PBCH may convey the information in either of the above examples.

In accordance with one or more cases, while a UE is in a first operation mode such as, for example, a mode for synchronization for initial access, the UE may receive a SS block transmitted by the BS intended for another second operation mode. For example, the BS may transmit an SS block for a group of UEs in an RRC-idle or an RRC-connected mode.

Further, in accordance with one or more examples, the UE may determine an operation mode of the BS and the received SS block through synchronization signals and/or channels. According to another case, the UE may determine an operation mode of the BS and the received SS block based on the determined location of the SS block within the BCH TTI. Further, the UE may determine an operation mode of the BS and the received SS block through a combination of the synchronization signals and/or channels and the determined location of the SS block within the BCH TTI.

According to one or more cases, a UE's processing and communication with BS may be based on a determined intended operation mode of BS of the received SS block(s). According to some cases, if the UE wants to do some measurements using the received SS block(s), these measurements may depend on the determined operation mode of BS of each SS block. According to other cases, if the UE wants to transmit RACH preamble to the BS based on the received SS block(s), the configuration (resources and waveform) of the RACH transmission may depend on the determined operation mode of BS of each RXed SS block.

In accordance with one or more aspects, an operation mode may refer to an initial acquisition in standalone mode of one or more UEs or an initial acquisition in standalone mode of one or more BSs. Further, in some cases, an operation mode may refer to an initial acquisition in non-standalone mode of one or more UEs or an initial acquisition in non-standalone mode of one or more BSs. According to some aspects, synchronization, beam management, and/or mobility management of UEs or BSs may be provided when in an idle/connected mode.

In one or more cases, the determination of the operation mode may additionally be based on a capability of one or more of the UEs and/or BSs that a BS is communicating with. One or more of the capabilities may include RF and digital processing capabilities, beam correspondence, power, etc.

In accordance with one or more aspects, a configuration may additionally refer to a subcarrier spacing (SCS) and/or a cyclic prefix (CP) size of signals and/or channels. The configuration may further refer to physical broadcast channel (PBCH) content and a coding configuration used to generate the PBCH from the content. Further, the configuration may refer to SS block composition, which may refer to the number and order of symbols carrying the synchronization signal and/or channels. For example, a number of PBCH symbols within block 4, 5, or 6 may be referenced. In some cases a configuration may additionally refer to an SS burst set composition, which may include the number and resources of the transmitted (TXed) SS blocks within a burst set. A configuration may also refer to the transmit (TX) power setting of the synchronization signals and/or channels. For example, the TX power offset between different synchronization signals and/or channels may be referenced. More specifically, the TX power offset between DMRS and PBCH tones, or between SSS and DMRS tones, may be referenced.

In some cases, an indication coming from another cell with the same or different RAT may be provided. For example, such an indication may be provided by a serving cell for a neighbor cell. There are some cases where the configuration may be specific to a UE, a BS, a group of UEs, or a group of BSs The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

Means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for determining, means for signaling, means for configuring, and/or means for providing may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1); a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a first wireless node comprising:

determining, at the first wireless node, an operation mode of a second wireless node, the operation mode being one of a plurality of operation modes comprising one or more of an initial acquisition in standalone mode, an initial acquisition in non-standalone mode, an idle mode, or a connected mode;

determining, at the first wireless node, a communication configuration of a plurality of communication configurations of at least one of one or more synchronization channels or one or more synchronization signals based on the determined operation mode, the communication configuration including a configuration of time and frequency resources used for the reception of the one or more synchronization channels or the one or more synchronization signals, wherein different communication configurations of the plurality of communication configurations are determined for different operations modes of the plurality of operation modes, and wherein the different communication configurations correspond to different time and frequency resources for communicating with the second wireless node; and receiving, from the second wireless node, the one or more synchronization channels or the one or more synchronization signals in accordance with the determined communication configuration, wherein a third wireless node, in communication with the second wireless node at a same time as the first wireless node, is in a second operation mode different than the operation mode of the second wireless node.

2. The method of claim 1, wherein determining the operation mode is based on one or more of:

an indication received from an upper layer signaling;
an indication received from a network;
a preconfigured schedule;
an indication received from one or more base stations (BSs);
an indication received from one or more user equipments (UEs); or
a measurement of one or more signals received from one or more UEs.

3. The method of claim 1, wherein:
the one or more synchronization channels comprise one or more physical broadcast channels (PBCH), and
the one or more synchronization signals comprise at least one of a primary synchronization signal (PSS), a secondary synchronization signal (SSS), a third synchronization signal (TSS) carrying SS-block timing index information, a demodulation reference signal (DMRS) for physical broadcast channel (PBCH), or a beam reference signal.

4. The method of claim 1, wherein:
the communication configuration further includes configuration of one or more of:
  at least one of a digital precoding or an analog precoding used for communicating at least one of the one or more synchronization channels or the one or more synchronization signals from one or more antenna ports;
  a number of antenna ports used for communication of at least one of the one or more synchronization channels or the one or more synchronization signals;
  a composition of at least one of a synchronization signal (SS) block, an SS burst, or an SS burst set;
  a beam sweeping pattern; or
  a waveform design of the one or more synchronization signals;
the communication configuration refers to one or more of:
  a subcarrier spacing (SCS) and a cyclic prefix (CP) size of signals or channels,
  physical broadcast channel (PBCH) content and a coding configuration,
  an SS block composition that refers to a number and order of symbols carrying the one or more synchronization signals or one or more synchronization channels,
  an SS burst set composition, or
  a transmit power setting of the one or more signals or one or more synchronization channels; and
the communication configuration is specific to at least one of a user equipment (UE), a base station (BS), a group of UEs, or a group of BSs.

5. The method of claim 1, further comprising:
communicating signaling of the operation mode with the second wireless node through the one or more synchronization channels or the one or more synchronization signals.

6. The method of claim 1, further comprising:
communicating signaling with the second wireless node of a location of a synchronization signal (SS) block consisting of at least one of the one or more synchronization channels or the one or more synchronization signals, within a broadcast channel (BCH) transmission time interval (TTI).

7. The method of claim 1, wherein receiving the one or more synchronization channels or the one or more synchronization signals in accordance with the determined communication configuration comprises:
receiving the one or more synchronization channels or the one or more synchronization signals on a first set of time-frequency resources when operating in at least one of the initial acquisition in standalone mode or the initial acquisition in non-standalone mode; and
receiving the one or more synchronization channels or the one or more synchronization signals on a second set of time-frequency resources different from the first set of time-frequency resources when operating in at least one of the idle mode or the connected mode.

8. The method of claim 7, wherein:
the first set of time-frequency resources includes a different frequency band for communication than the second set of time-frequency resources, and
the first set of time-frequency resources includes a synchronization raster.

9. The method of claim 7, wherein:
the first set of time-frequency resources includes the same frequency band as the second set of time-frequency resources, and
the first set of time-frequency resources includes different time locations as compared to the second set of time-frequency resources.

10. The method of claim 1, wherein receiving the one or more synchronization channels or the one or more synchronization signals in accordance with the determined communication configuration comprises:
receiving, in a discontinuous reception (DRX) operation mode, the one or more synchronization channels or the one or more synchronization signals on a set of DRX time-frequency resources,
  wherein the DRX time-frequency resources include one or more of a non-raster location and time domain resources different from initial acquisition time domain resources, and
  wherein the one or more synchronization channels or the one or more synchronization signals are transmitted before a DRX ON cycle to a select group of user equipments (UEs), or a group of base stations (BSs).

11. The method of claim 1, further comprising:
communicating signaling of the communication configuration with the second wireless node through one or more of a master information block (MIB), a system information block (SIB), or a radio resource control (RRC) signaling.

12. The method of claim 1, further comprising:
communicating signaling of the communication configuration with the second wireless node through one or more of an master information block (MIB), a system information block (SIB), or a radio resource control (RRC) signaling over a first system,
wherein dual connectivity is provided between the first system and a second system,
wherein the first system is at least one of a long-term evolution (LTE) system or a first new radio (NR) system and the second system is a second NR system,
wherein the first and second systems operate at different carrier frequencies, and
wherein the first NR system operates at a sub-6 GHz carrier frequency, and the second NR system operates at an mmWave carrier frequency.

13. The method of claim 1, wherein:
determining the operation mode is based on a capability of the second wireless node or a group of UEs or base stations (BSs) that the second wireless node is part of, and the capability includes one or more of an RF processing capability, a digital processing capability, a beam correspondence, and a power.

14. The method of claim 1, wherein:
   determining the operation mode is based on an indication communicated with a cell with a same or different radio access technology (RAT), and
   the cell is a serving cell or a neighbor cell.

15. The method of claim 1, wherein determining the communication configuration comprises determining the communication configuration to include a first configuration of time and frequency resources when the determined operation mode is a first operation mode, and determining the communication configuration to include a second configuration of time and frequency resources when the determined operation mode is a second operation mode.

16. The method of claim 1, wherein a third wireless node in communication with the first wireless node at a same time as the second wireless node is in a second operation mode different than the operation mode of the second wireless node.

17. A first wireless node comprising:
   a memory; and
   a processor coupled to the memory, the memory and the processor configured to:
   determine an operation mode of a second wireless node, the operation mode being one of a plurality of operation modes comprising one or more of an initial acquisition in standalone mode, an initial acquisition in non-standalone mode, an idle mode, or a connected mode;
   determine a communication configuration of a plurality of communication configurations of at least one of one or more synchronization channels or one or more synchronization signals based on the determined operation mode, the communication configuration including a configuration of time and frequency resources used for the reception of the one or more synchronization channels or the one or more synchronization signals, wherein different communication configurations of the plurality of communication configurations are determined for different operations modes of the plurality of operation modes, and wherein the different communication configurations correspond to different time and frequency resources for communicating with the second wireless node; and
   receive, from the second wireless node, the one or more synchronization channels or the one or more synchronization signals in accordance with the determined communication configuration,
   wherein a third wireless node, in communication with the second wireless node at a same time as the first wireless node, is in a second operation mode different than the operation mode of the second wireless node.

18. The wireless node of claim 17, wherein the memory and the processor are further configured to:
   communicate signaling of the operation mode with the second wireless node through the one or more synchronization channels or the one or more synchronization signals.

19. The wireless node of claim 17, wherein the memory and the processor are further configured to:
   communicate signaling with the second wireless node of a location of a synchronization signal (SS) block consisting of at least one of the one or more synchronization channels or the one or more synchronization signals, within a broadcast channel (BCH) transmission time interval (TTI).

20. The wireless node of claim 17, wherein receiving the one or more synchronization channels or the one or more synchronization signals in accordance with the determined communication configuration comprises:
   receiving the one or more synchronization channels or the one or more synchronization signals on a first set of time-frequency resources when operating in at least one of the initial acquisition in standalone mode or the initial acquisition in non-standalone mode; and
   receiving the one or more synchronization channels or the one or more synchronization signals on a second set of time-frequency resources different from the first set of time-frequency resources when operating in at least one of the idle mode or the connected mode.

21. The wireless node of claim 17, wherein receiving the one or more synchronization channels or the one or more synchronization signals in accordance with the determined communication configuration comprises:
   receiving, in a discontinuous reception (DRX) operation mode, the one or more synchronization channels or the one or more synchronization signals on a set of DRX time-frequency resources,
      wherein the DRX time-frequency resources include one or more of a non-raster location and time domain resources different from initial acquisition time domain resources, and
      wherein the one or more synchronization channels or the one or more synchronization signals are transmitted before a DRX ON cycle to a select group of user equipments (UEs), or a group of base stations (BSs).

22. The wireless node of claim 17, wherein the memory and the processor are further configured to:
   communicate signaling of the communication configuration with the second wireless node through one or more of a master information block (MIB), a system information block (SIB), or a radio resource control (RRC) signaling.

23. The wireless node of claim 17, wherein the memory and the processor are further configured to:
   communicate signaling of the communication configuration with the second wireless node through one or more of an master information block (MIB), a system information block (SIB), or a radio resource control (RRC) signaling over a first system,
   wherein dual connectivity is provided between the first system and a second system,
   wherein the first system is at least one of a long-term evolution (LTE) system or a first new radio (NR) system and the second system is a second NR system,
   wherein the first and second systems operate at different carrier frequencies, and
   wherein the first NR system operates at a sub-6 GHz carrier frequency, and the second NR system operates at an mmWave carrier frequency.

24. The wireless node of claim 17, wherein:
   determining the operation mode is based on a capability of the second wireless node or a group of UEs or base stations (BSs) that the second wireless node is part of, and the capability includes one or more of an RF processing capability, a digital processing capability, a beam correspondence, and a power.

25. The wireless node of claim 17, wherein:
   determining the operation mode is based on an indication communicated with a cell with a same or different radio access technology (RAT), and
   the cell is a serving cell or a neighbor cell.

26. The wireless node of claim 17, wherein determining the communication configuration comprises determining the communication configuration to include a first configuration of time and frequency resources when the determined operation mode is a first operation mode, and determining the communication configuration to include a second configuration of time and frequency resources when the determined operation mode is a second operation mode.

27. A first wireless node comprising:
  means for determining an operation mode of a second wireless node, the operation mode being one of a plurality of operation modes comprising one or more of an initial acquisition in standalone mode, an initial acquisition in non-standalone mode, an idle mode, or a connected mode;
  means for determining a communication configuration of a plurality of communication configurations of at least one of one or more synchronization channels or one or more synchronization signals based on the determined operation mode, the communication configuration including a configuration of time and frequency resources used for the reception of the one or more synchronization channels or the one or more synchronization signals, wherein different communication configurations of the plurality of communication configurations are determined for different operations modes of the plurality of operation modes, and wherein the different communication configurations correspond to different time and frequency resources for communicating with the second wireless node; and
  means for receiving, from the second wireless node, the one or more synchronization channels or the one or more synchronization signals in accordance with the determined communication configuration,
  wherein a third wireless node, in communication with the second wireless node at a same time as the first wireless node, is in a second operation mode different than the operation mode of the second wireless node.

28. A non-transitory computer-readable storage medium comprising instructions, that when executed by a first wireless node, cause the first wireless node to perform operations comprising:
  determining, at the first wireless node, an operation mode of a second wireless node, the operation mode being one of a plurality of operation modes comprising one or more of an initial acquisition in standalone mode, an initial acquisition in non-standalone mode, an idle mode, or a connected mode;
  determining, at the first wireless node, a communication configuration of a plurality of communication configurations of at least one of one or more synchronization channels or one or more synchronization signals based on the determined operation mode, the communication configuration including a configuration of time and frequency resources used for the reception of the one or more synchronization channels or the one or more synchronization signals, wherein different communication configurations of the plurality of communication configurations are determined for different operations modes of the plurality of operation modes, and wherein the different communication configurations correspond to different time and frequency resources for communicating with the second wireless node; and
  receiving, from the second wireless node, the one or more synchronization channels or the one or more synchronization signals in accordance with the determined communication configuration,
  wherein a third wireless node, in communication with the second wireless node at a same time as the first wireless node, is in a second operation mode different than the operation mode of the second wireless node.

\* \* \* \* \*